US012318344B2

(12) United States Patent
Lim et al.

(10) Patent No.: US 12,318,344 B2
(45) **Date of Patent: *Jun. 3, 2025**

(54) WALKING ASSISTANCE METHOD AND APPARATUSES PERFORMING THE SAME

(71) Applicant: Samsung Electronics Co., Ltd., Suwon-si (KR)

(72) Inventors: Bokman Lim, Hwaseong-si (KR); Kyung-Rock Kim, Seoul (KR); Youngbo Shim, Seoul (KR); Jusuk Lee, Suwon-si (KR); Jun-Won Jang, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 1204 days.

This patent is subject to a terminal disclaimer.

(21) Appl. No.: 17/123,633

(22) Filed: Dec. 16, 2020

(65) Prior Publication Data

US 2021/0100715 A1 Apr. 8, 2021

Related U.S. Application Data

(63) Continuation of application No. 14/972,941, filed on Dec. 17, 2015, now Pat. No. 10,945,908.

(30) Foreign Application Priority Data

Jul. 23, 2015 (KR) ........................ 10-2015-0104385

(51) Int. Cl.

*A61H 3/00* (2006.01)
*A61H 1/02* (2006.01)

(52) U.S. Cl.

CPC ............. *A61H 3/00* (2013.01); *A61H 1/0244* (2013.01); *A61H 2201/1215* (2013.01);

(Continued)

(58) Field of Classification Search

CPC .................... A61H 3/00; A61H 1/0244; A61H 2201/1215; A61H 2201/1628;

(Continued)

(56) References Cited

U.S. PATENT DOCUMENTS

| | | | | |
|---|---|---|---|---|
| 8,298,164 | B2 | 10/2012 | Yasuhara | |
| 10,945,908 | B2 * | 3/2021 | Lim | A61H 1/0244 |

(Continued)

FOREIGN PATENT DOCUMENTS

| | | | |
|---|---|---|---|
| CN | 104582668 | A | 4/2015 |
| JP | 2003150036 | A | 5/2003 |

(Continued)

OTHER PUBLICATIONS

CN OA issued by China National Intellectual Property Administration on Sep. 30, 2022 for the corresponding CN Patent Application No. 202011470982.2.

(Continued)

*Primary Examiner* — Charles R Kasenge

(74) *Attorney, Agent, or Firm* — Harness, Dickey & Pierce, P.L.C.

(57) ABSTRACT

A walking assistance method may include receiving at least one abnormal gait type selected from a plurality of abnormal gait types, and differently controlling a walking assistance apparatus based on the at least one abnormal gait type.

20 Claims, 17 Drawing Sheets

(52) U.S. Cl.
CPC ................ *A61H 2201/1628* (2013.01); *A61H 2201/163* (2013.01); *A61H 2201/164* (2013.01); *A61H 2201/1642* (2013.01); *A61H 2201/165* (2013.01); *A61H 2201/1671* (2013.01); *A61H 2201/5007* (2013.01); *A61H 2201/5035* (2013.01); *A61H 2201/5046* (2013.01); *A61H 2203/0406* (2013.01)

(58) Field of Classification Search
CPC ........ A61H 2201/163; A61H 2201/164; A61H 2201/1642; A61H 2201/165; A61H 2201/1671; A61H 2201/5007; A61H 2201/5035; A61H 2201/5046; A61H 2203/0406; A61H 2003/007; A61H 2201/0157; A61H 2201/1207; A61H 2205/10
See application file for complete search history.

(56) References Cited

U.S. PATENT DOCUMENTS

| | | | | |
|---|---|---|---|---|
| 2002/0052663 | A1* | 5/2002 | Herr .......................... | A61F 2/70 623/44 |
| 2003/0093021 | A1 | 5/2003 | Goffer | |
| 2004/0102723 | A1 | 5/2004 | Horst | |
| 2012/0259255 | A1 | 10/2012 | Tomlinson et al. | |
| 2013/0310979 | A1 | 11/2013 | Herr et al. | |
| 2014/0012164 | A1 | 1/2014 | Tanaka | |
| 2014/0121575 | A1 | 5/2014 | Yasuhara et al. | |
| 2014/0364962 | A1* | 12/2014 | Gregg ................... | A61F 2/6607 623/24 |
| 2016/0058646 | A1* | 3/2016 | Seo ...................... | A61H 1/0262 623/32 |
| 2016/0074180 | A1* | 3/2016 | Lenzi .................... | A61F 2/6607 623/24 |
| 2016/0101515 | A1 | 4/2016 | Lim et al. | |

FOREIGN PATENT DOCUMENTS

| | | | |
|---|---|---|---|
| JP | 4178187 | B2 | 11/2008 |
| JP | 2010-017465 | A | 1/2010 |
| JP | 2012-143449 | A | 8/2012 |
| JP | 2015-008960 | A | 1/2015 |
| KR | 10-2013-0105867 | A | 9/2013 |
| KR | 10-1476889 | B1 | 12/2014 |
| KR | 10-1490885 | B1 | 2/2015 |
| KR | 10-2015-0039386 | A | 4/2015 |
| KR | 10-2015-0053065 | | 5/2015 |

OTHER PUBLICATIONS

JP OA issued by Japanese Patent Office on Oct. 11, 2022 for the corresponding JP Patent Application No. 2021-196016.
Extended European Search Report issued on Nov. 28, 2016 for corresponding EP Application No. 16180051.1.

* cited by examiner

Objective function value

| | normal | | | crouch | | | footdrop | | |
|---|---|---|---|---|---|---|---|---|---|
| | free | assisted | variation | free | assisted | variation | free | assisted | variation |
| $J_{energy}$ | 49.8 | 48.9 | -1.8% | 66.1 | 64.4 | -2.5% | **54.0** | **49.3** | -8.7% |
| $J_{style}$ | 1.8 | 2.2 | 21.7% | 2.0 | 1.4 | -30.3% | 2.5 | 2.3 | -8.9% |
| $J_{stability}$ | 1.9 | 1.7 | -8.9% | **7.5** | **2.1** | -72.0% | 2.0 | 1.8 | -7.7% |
| total | 53.5 | 52.8 | -1.3% | 75.6 | 67.9 | -10.2% | 58.5 | 53.4 | -8.6% |

Optimization control parameters

| Parameter | flexion | | | | | extension | | | | |
|---|---|---|---|---|---|---|---|---|---|---|
| | peak loc (%) | peak torque (Nm) | peak dur (%) | ascd dur (%) | dscd dur (%) | peak loc (%) | peak torque (Nm) | peak dur (%) | ascd dur (%) | dscd dur (%) |
| | 50 | 3 | 5 | 10 | 10 | 50 | 3 | 5 | 10 | 10 |
| | **65** | **1.2** | 5 | 11 | 5 | **62** | **3.8** | 6 | 12 | 9 |
| | **83** | **2.9** | 4 | 13 | 7 | **55** | **4.9** | 4 | 9 | 11 |
| | **63** | **3.6** | 7 | 9 | 5 | **84** | **1.5** | 8 | 20 | 12 |

* 1step cycle = 100%

WALKING ASSISTANCE METHOD AND APPARATUSES PERFORMING THE SAME

CROSS-REFERENCE TO RELATED APPLICATION

This application is a continuation application of U.S. application Ser. No. 14/972,941, filed on Dec. 17, 2015, which claims under 35 U.S.C. §119 to Korean Patent Application No. 10-2015-0104385, filed on Jul. 23, 2015, in the Korean Intellectual Property Office, the entire contents of each of which are incorporated herein by reference in its entirety.

BACKGROUND

1. Field

At least one example embodiment relate to a walking assistance method and/or an apparatus performing the same.

2. Description of the Related Art

With the onset of rapidly aging societies, many people may experience inconvenience and pain from joint problems, and interest in walking assistance apparatuses enabling the elderly or patients with joint problems to walk with less effort, may increase. Furthermore, walking assistance apparatuses for intensifying muscular strength of human bodies may be useful for military purposes.

In general, walking assistance apparatuses may include body frames disposed on a trunk of a user, pelvic frames coupled to lower sides of the body frames to cover pelvises of the user, femoral frames disposed on thighs of the user, sural frames disposed on calves of the user, and/or pedial frames disposed on feet of the user. The pelvic frames and femoral frames may be connected rotatably by hip joint portions, the femoral frames and sural frames may be connected rotatably by knee joint portions, and/or the sural frames and pedial frames may be connected rotatably by ankle joint portions.

SUMMARY

Some example embodiments relate to a walking assistance method.

In some example embodiments, the walking assistance method may include receiving at least one abnormal gait type selected from a plurality of abnormal gait types, and differently controlling a walking assistance apparatus based on the at least one abnormal gait type in response to the receiving.

The controlling may include generating an assist torque profile based on the at least one abnormal gait type and controlling the walking assistance apparatus based on the assist torque profile, and the assist torque profile may include at least one torque parameter for controlling the walking assistance apparatus.

When the at least one abnormal gait type includes a first abnormal gait type and a second abnormal gait type, the generating may include generating the assist torque profile based on first torque parameters corresponding to a first assist torque profile of the first abnormal gait type and second torque parameters corresponding to a second assist torque profile of the second abnormal gait type.

The generating of the assist torque profile based on the first torque parameters and the second torque parameters may include generating the assist torque profile by combining the first torque parameters and the second torque parameters.

The generating of the assist torque profile based on the first torque parameters and the second torque parameters may include generating the assist torque profile by adding the first torque parameters and the second torque parameters based on a weight.

The at least one abnormal gait type may include at least one of a crouch gait, a steppage gait, an antalgic gait, an ataxic gait type, a festinating gait, a vaulting gait, a lurching gait, an equinus gait, a short leg gait, a hemiplegic gait, a circumduction gait, a tabetic gait, a neurogenic gait, a scissoring gait, and a Parkinsonian gait.

The walking assistance method may further include displaying the plurality of abnormal gait types.

The plurality of abnormal gait types may be displayed on at least one of the walking assistance apparatus and an external apparatus of the walking assistance apparatus.

The external apparatus may be at least one of an electronic apparatus and a remote controller configured to control the walking assistance apparatus, and the electronic apparatus may be configured to communicate with the walking assistance apparatus and the remote controller.

The walking assistance method may further include storing torque parameters corresponding to each of assist torque profiles of the plurality of abnormal gait types.

The storing may include computing a first torque mapped to each joint of a user for each of the plurality of abnormal gait types and a second torque to be generated by the walking assistance apparatus for assisting a gait of the user, and generating a gait motion based on the first torque and the second torque, calculating an objective function based on the gait motion, and generating the torque parameters based on a result of the calculating.

The generating of the gait motion may include performing a forward dynamics computation on the first torque and the second torque, and generating the gait motion based on a result of the forward dynamics computation.

Other example embodiments relate to a walking assistance apparatus.

In some example embodiments, the walking assistance apparatus may include a driver configured to assist a gait of a user, and a controller configured to receive at least one abnormal gait type selected from a plurality of abnormal gait types and differently control the driver based on the at least one abnormal gait type.

The controller may be configured to generate an assist torque profile based on the at least one abnormal gait type, the driver may be configured to control the walking assistance apparatus based on the assist torque profile, and the assist torque profile may include at least one torque parameter for controlling the walking assistance apparatus.

When the at least one abnormal gait type includes a first abnormal gait type and a second abnormal gait type, the controller may be configured to generate the assist torque profile based on first torque parameters corresponding to a first assist torque profile of the first abnormal gait type and second torque parameters corresponding to a second assist torque profile of the second abnormal gait type.

The controller may be configured to generate the assist torque profile by combining the first torque parameters and the second torque parameters.

The controller may be configured to generate the assist torque profile by adding the first torque parameters and the second torque parameters based on a weight.

The at least one abnormal gait type may include at least one of a crouch gait, a steppage gait, an antalgic gait, an ataxic gait, a festinating gait, a vaulting gait, a lurching gait, an equinus gait, a short leg gait, a hemiplegic gait, a circumduction gait, a tabetic gait, a neurogenic gait, a scissoring gait, and a Parkinsonian gait.

The at least one abnormal gait type may be displayed on a display.

The display may be included in at least one of the walking assistance apparatus and an external apparatus of the walking assistance apparatus.

The external apparatus may be at least one of an electronic apparatus and a remote controller configured to control the walking assistance apparatus, and the electronic apparatus may be configured to communicate with at least one of the walking assistance apparatus and the remote controller.

The walking assistance apparatus may further include a memory configured to store torque parameters corresponding to each assist torque profile of the plurality of abnormal gait types.

The torque parameters may be generated by calculating an objective function based on a gait motion generated using a first torque mapped to each joint of a user for each of the plurality of abnormal gait types and a second torque to be generated by the walking assistance apparatus.

Other example embodiments relate to a walking assistance system.

In some example embodiments, the walking assistance system may include the walking assistance apparatus and a remote controller configured to control the walking assistance apparatus.

Other example embodiments relate to a walking assistance system.

In some example embodiments, the walking assistance system may include the walking assistance apparatus, and a parameter generation apparatus configured to generate a gait motion based on a first torque mapped to each joint of a user for each of the plurality of abnormal gait types and a second torque to be generated by the walking assistance apparatus, calculating an object function based on the gait motion, and generating torque parameters corresponding to each of assist torque profiles of the abnormal gait types based on a result of the calculating.

Some example embodiments relate to walking assistance apparatus.

In some example embodiments, the walking assistance apparatus includes a support configured to support at least a portion of a body of a user; a driver configured to generate power to move the support to assist a motion of a user; and a controller including a processor configured to control the driver based on an abnormality associated with a gait of a user.

In some example embodiments, the abnormality is one of a plurality of abnormalities, and the controller is configured to control the driver such that the driver is driven based on an assistance torque profile that depends on which one of the plurality of abnormalities is associated with the user.

In some example embodiments, the controller is configured to determine which one of the plurality of abnormalities is associated with the user by receiving an input from the user indicating same.

In some example embodiments, the controller is configured to generate the assistance torque profile based on received torque parameters corresponding to the abnormality associated with the gait of the user.

In some example embodiments, the torque parameters include at least a peak torque applied to the body of the user and a time associated with a start thereof.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
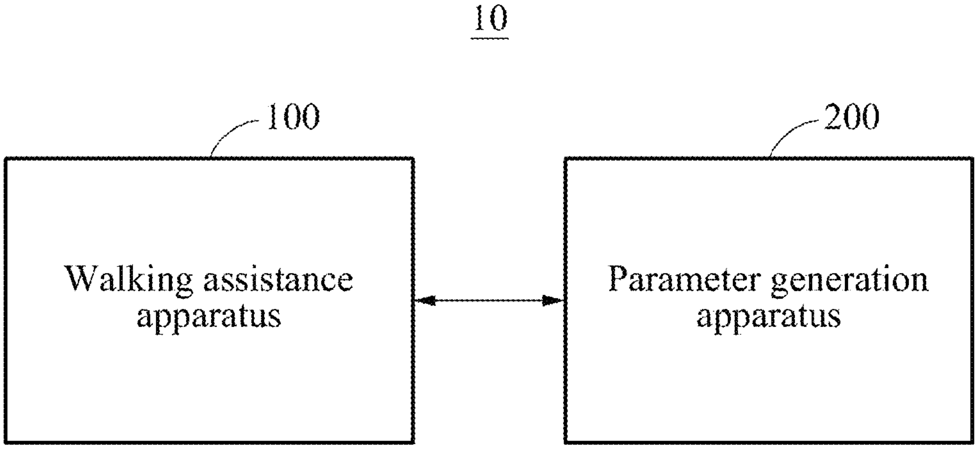
FIG. 1 is a block diagram illustrating an example of a walking assistance system according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is “connected”, “coupled”, or “joined” to another component, a third component may be “connected”, “coupled”, and “joined” between the first and second components, although the first component may be directly connected, coupled or joined to the second component.

Spatially relative terms, such as “beneath,” “below,” “lower,” “under,” “above,” “upper,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below,” “beneath,” or “under,” other elements or features would then be oriented “above” the other elements or features. Thus, the example terms “below” and “under” may encompass both an orientation of above and below. The device may be otherwise oriented (rotated 90 degrees or at other orientations) and the spatially relative descriptors used herein interpreted accordingly. In addition, when an element is referred to as being “between” two elements, the element may be the only element between the two elements, or one or more other intervening elements may be present.

The terminology used herein is for the purpose of describing particular embodiments only and is not intended to be limiting. As used herein, the singular forms “a,” “an,” and “the,” are intended to include the plural forms as well, unless the context clearly indicates otherwise. It will be further understood that the terms “comprises,” “comprising,” “includes,” and/or “including,” when used herein, specify the presence of stated features, integers, steps, operations, elements, and/or components, but do not preclude the presence or addition of one or more other features, integers, steps, operations, elements, components, and/or groups thereof. Expressions such as “at least one of,” when preceding a list of elements, modify the entire list of elements and do not modify the individual elements of the list. Also, the term “exemplary” is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Various example embodiments will now be described more fully with reference to the accompanying drawings in which some example embodiments are shown. In the drawings, the thicknesses of layers and regions are exaggerated for clarity.

FIG. 1 is a block diagram illustrating a walking assistance system 10 according to at least one example embodiment.

Referring to FIG. 1, the walking assistance system 10 may include a walking assistance apparatus 100 and a parameter generation apparatus 200. In this disclosure, the term "walking" may be interchangeably used as a term "gait".

The walking assistance apparatus 100 may be worn by a target body, for example, a user, to assist the user during an exercise and/or walking. The target body may be, for example, a person, an animal, and a robot, however, an example of the target body is not limited thereto.

The walking assistance apparatus 100 may assist a gait and/or a motion of, for example, a hand, an upper arm, a lower arm, and the other part of an upper body of the user. Alternatively, the walking assistance apparatus 100 may assist a gait and/or a motion of, for example, a foot, a calf, a thigh, and the other part of a lower body of the user. Thus, the walking assistance apparatus 100 may assist a gait and/or a motion of a part of the user.

The walking assistance apparatus 100 may receive at least one abnormal gait type, for example, a pathological gait type, selected from a plurality of abnormal gait types. In response to the receiving, the walking assistance apparatus 100 may be differently controlled based on the at least one abnormal gait type. As an example, the walking assistance apparatus 100 may select at least one abnormal gait type corresponding to an input of a user and assist a gait of the user based on an assist torque profile corresponding to the at least one abnormal gait type. Thus, the walking assistance apparatus 100 may effectively assist various types of abnormal gaits without using a sensor for sensing a joint motion.

An abnormal gait may indicate a gait evolved to continue an abnormal or pathological gait pattern when a normal gait pattern collapses as a result of a functional disorder due to, for example, a partial damage, weakness, a loss of flexibility, a pain, a bad habit, and a neural or muscular injury. The abnormal gait may indicate, for example, a pathological gait pattern. In this disclosure, the term "abnormal" may be interchangeably used with the term "pathological".

In an example, the at least one abnormal gait type may include at least one of a crouch gait or genu recurvatum gait, a steppage gait or footdrop gait, an antalgic gait, an ataxic gait, a festinating gait, a vaulting gait, a lurching gait, an equinus gait, a short leg gait, a hemiplegic gait, a circumduction gait, a tabetic gait, a neurogenic gait, a scissoring gait, and a Parkinsonian gait. The lurching gait may indicate any form of staggering gait and include, for example, a waddling gait, a gluteus maximus gait, and a trendelenburg gait. The waddling gait may indicate a gait characterized in swaying from side to side. The gluteus maximus gait may indicate a gait in which a chest is bent backward to maintain a hip extension and a trunk movement is suddenly exaggerated to walk from time to time. The trendelenburg gait may indicate a gait performed by tilting a chest toward a weakened leg to maintain a center of gravity and prevent a pelvis of a weakened side from drooping when standing on the ground with a weakened lower limb.

The crouch gait may indicate a gait performed with a posture of hunching all joints of a hip, a knee, and an ankle to overcome a gait instability. The steppage gait may indicate a gait in which toes are bent downward to the ground and a top of a foot is dropped to the ground. The antalgic gait may indicate a gait for avoiding a pain on a painful portion. The ataxic gait may indicate a gait characterized by an unsteady stride, a wide space between feet, a shaken body, and an unstable step appearing intoxicated. The festinating gait may indicate a gait performed with stiff arms, a trunk flexed forward, a short stance, and accelerating steps as if unbreakable. The vaulting gait may indicate a gait using a leg of a non-affected side, for example, a non-paralyzed side, in lieu of a leg of an affected side, for example, a paralyzed side when a knee joint is not extendable. The equines gait may indicate a gait performed using tiptoes while heels are not in contact with the ground. The hemiplegic gait may indicate a gait in which, due to a stiffness, an entire body is slightly tilted to the affected side, a swing of an upper arm in the affected side is lost, a shoulder of the affected side is in a descending state, and the lower limb appears in a primitively curved form. The circumduction gait may indicate a gait in which an entire leg swings due to a difficulty in bending the knee. The scissoring gait may indicate a gait performed by crossing or grazing legs or knees against to one another with a squatting posture in a state in which the legs are slightly bent inward. The Parkinsonian gait may indicate a gait performed as if shuffling a sole on the ground with an anterior flexion posture.

The parameter generation apparatus 200 may generate torque parameters corresponding to each assist torque profile of a plurality of abnormal gait types. The parameter generation apparatus 200 may generate torque parameters to which unique characteristics of an abnormal gait are applied. Descriptions related to the parameter generation apparatus 200 will also be provided with reference to FIGS. 8 through 13B.

The walking assistance apparatus 100 may store the torque parameters corresponding to each assist torque profile of the plurality of abnormal gait types generated in the parameter generation apparatus 200.

Although FIG. 1 illustrates the parameter generation apparatus 200 disposed externally to the walking assistance apparatus 100 as an example, the disclosure is not limited thereto. For example, depending on an example, the parameter generation apparatus 200 may also be included in the walking assistance apparatus 100.

Figure 2:
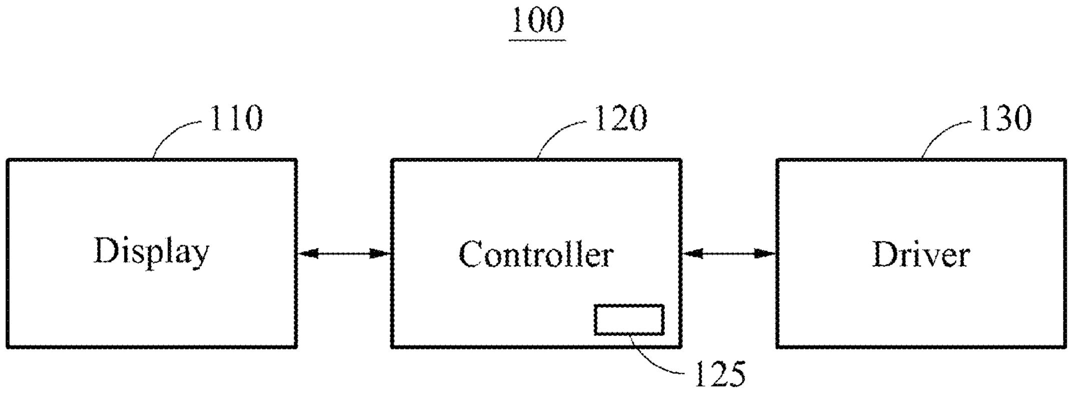
FIG. 2 is a block diagram illustrating a walking assistance apparatus of FIG. 1.
Figure 3:
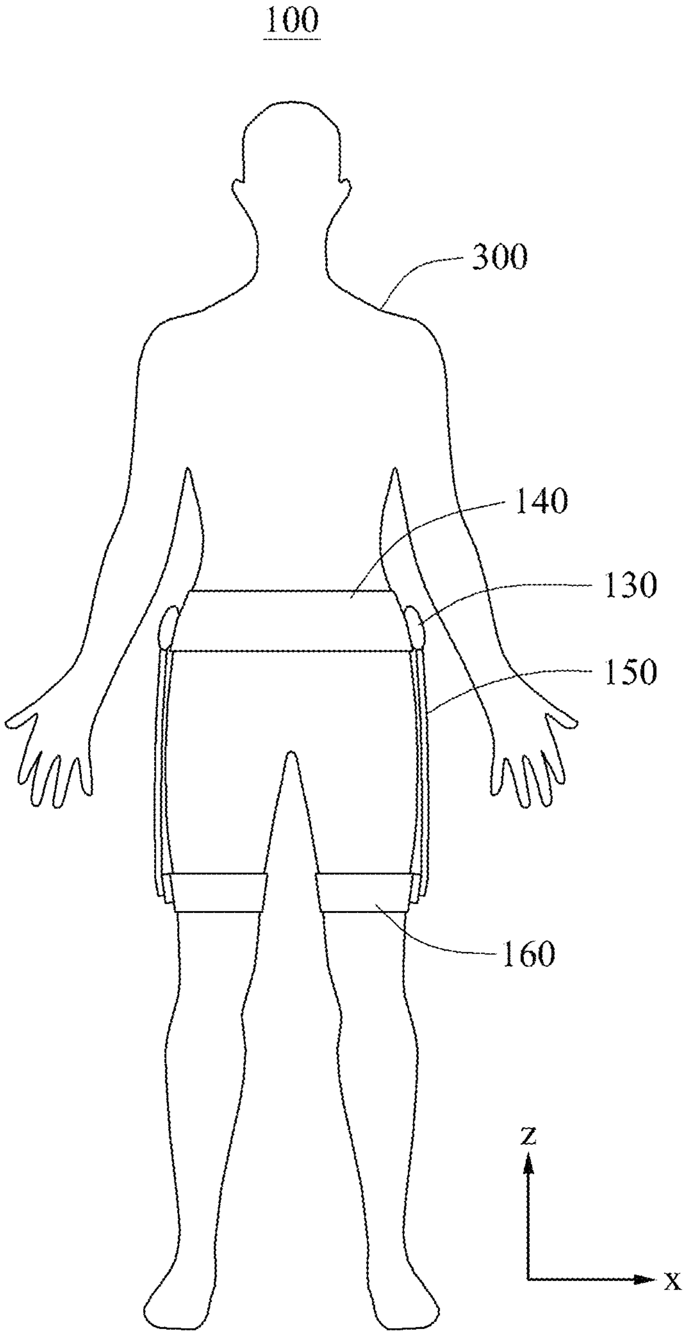
FIG. 3 is a front view of a target body wearing the walking assistance apparatus of FIG. 1.
Figure 4:
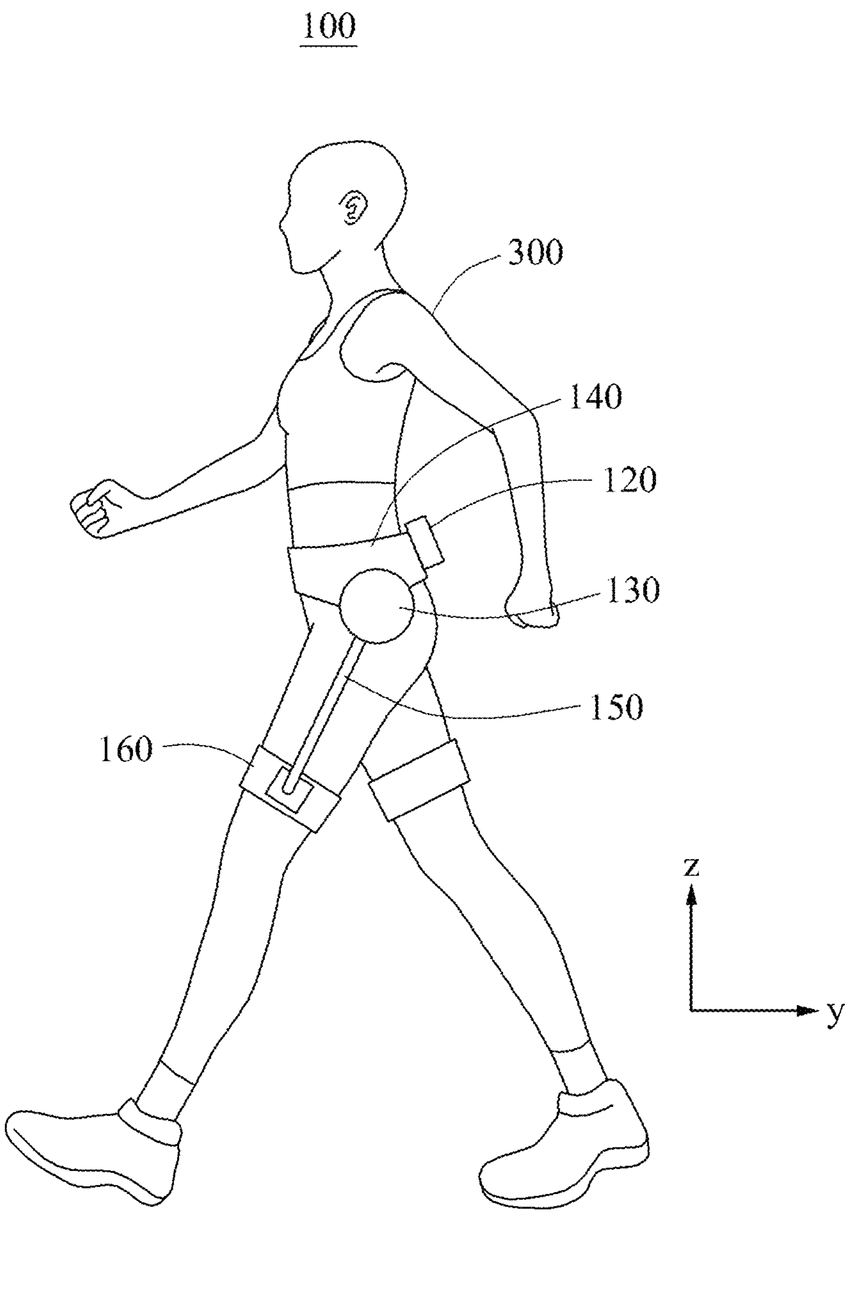
FIG. 4 is a side view of a target body wearing the walking assistance apparatus of FIG. 1.

FIG. 2 is a block diagram illustrating the walking assistance apparatus 100 of FIG. 1. FIG. 3 is a front view of a target body wearing the walking assistance apparatus 100 of FIG. 1. FIG. 4 is a side view of a target body wearing the walking assistance apparatus 100 of FIG. 1.

Referring to FIGS. 1 through 4, the walking assistance apparatus 100 may include a display 110, a controller 120, and a driver 130. The walking assistance apparatus 100 may also include a fixing member 140, a force transmitting member 150, and a supporting member 160.

Although FIGS. 3 and 4 illustrate the walking assistance apparatus 100, for example, a hip-type walking assistance apparatus, operating on a thigh of the user 300, the type of the walking assistance apparatus 100 is not limited thereto. For example, in some example embodiments, the walking assistance apparatus 100 may be applicable to, for example, a walking assistance apparatus that supports an entire pelvic limb, a walking assistance apparatus that supports a portion of a pelvic limb, and the like. The walking assistance apparatus that supports a portion of a pelvic limb may be applicable to, for example, a walking assistance apparatus that supports up to a knee, and a walking assistance apparatus that supports up to an ankle.

The display 110 may display a plurality of abnormal gait types to be viewed by a user 300. For example, the user 300 may select a gait type of the user 300 from the displayed abnormal gait types.

Figure 5:
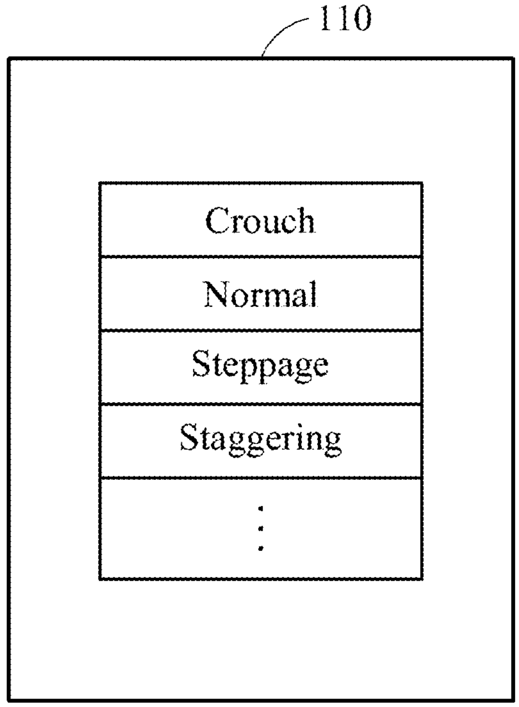
FIG. 5 illustrates an example of displaying abnormal gait types on a display according to at least one example embodiment.

As an example, the abnormal gait type may be displayed on the display 110 as illustrated in FIG. 5. In this example, gait types displayed on the display 110 may include a normal gait type.

The display 110 may be implemented as, for example, a touch screen, a liquid crystal display (LCD), a thin film transistor-liquid crystal display (TFT-LCD), a liquid emitting diode (LED) display, an organic LED (OLED) display, an active matrix OLED (AMOLED) display, and a flexible display.

The controller 120 may include a memory 125 and a processor (not shown).

The memory may be a non-transitory computer-readable storage media configured to store program code that, when executed by the processor, configures the processor as a special purpose computer to determine at least one of the plurality of abnormal gait types in response to an input of the user 300, generate an assist torque profile based on torque parameters corresponding to the determined abnormal gait type, and control the driver 140 to output an assistance torque based on the assist torque profile. Therefore, the controller 120 may improve the functioning of the walking assistance apparatus 100 itself by effectively assist various types of abnormal gaits without using a sensor for sensing a joint motion.

Although FIG. 2 illustrates the memory 125 included in the controller 120 as an example, the memory 120 may also be disposed externally to the controller 120.

The memory 125 may store the torque parameters corresponding to each assist torque profile of the plurality of abnormal gait types. The torque parameters may correspond to each assist torque profile of the abnormal gait types. In some example embodiments, the torque parameters stored in the memory 125 may be, for example, the torque parameters generated in the parameter generation apparatus 200.

The controller 120 may control an overall operation of the walking assistance apparatus 100. For example, the controller 120 may control the driver 140 to output a driving force to assist a gait of the user 300. The driving force may be, for example, an assistance torque.

The controller 120 may select at least one type from the plurality of abnormal gait types in response to an input of the user 300, and generate the assist torque profile such that the assist torque profile corresponds to the selected one of the plurality of abnormal gait types. For example, the controller 120 may generate an assist torque profile of the at least one type based on the torque parameters corresponding to the at least one type stored in the memory 125. The assist torque profile may include at least one torque parameter for controlling the walking assistance apparatus 100.

When the at least one abnormal gait type includes a first abnormal gait type and a second abnormal gait type, the controller 120 may generate the assist torque profile based on the at least one abnormal gait type using first torque parameters corresponding to a first assist torque profile of the first abnormal gait type and second torque parameters corresponding to a second assist torque profile of the second abnormal gait type.

As an example, the controller 120 may generate the assist torque profile by combining the first torque parameters and the second torque parameters.

As another example, the controller 120 may generate the assist torque profile by adding the first torque parameters and the second torque parameters based on a weight. For example, the weight of the first abnormal gait type and the second abnormal gait type may be determined based on a ratio between the first abnormal gait type and the second abnormal gait type indicated in the gait type of the user 300.

The driver 130 may be disposed on each of a left hip portion and a right hip portion of the user 300 to drive both hip joints of the user 300.

The driver 130 may generate a force to assist a gait of the user 300 based on the assist torque profile generated in the controller 120.

The fixing member 140 may be attached to a part, for example, a waist of the user 300. The fixing member 140 may be in contact with at least a portion of an external surface of the user 300. The fixing member 140 may cover along the external surface of the user 300.

The force transmitting member 150 may be disposed between the driver 130 and the supporting member 160 to connect the driver 130 and the supporting member 160. The force transmitting member 150 may transmit the driving force received from the driver 130 to the supporting member 160. As an example, the force transmitting member 150 may be a longitudinal member such as, for example, a wire, a cable, a string, a rubber band, a spring, a belt, and a chain.

The supporting member 160 may support a target part, for example, a thigh of the user 300. The supporting member 160 may be disposed to cover at least a portion of the user 300. The supporting member 160 may exert a force on the target part of the user 300 using the driving force received from the force transmitting member 150. In some example embodiments, the supporting member 160 may include a strap configured to attach to a portion, for example, the thigh of the user 300.

Figure 6:
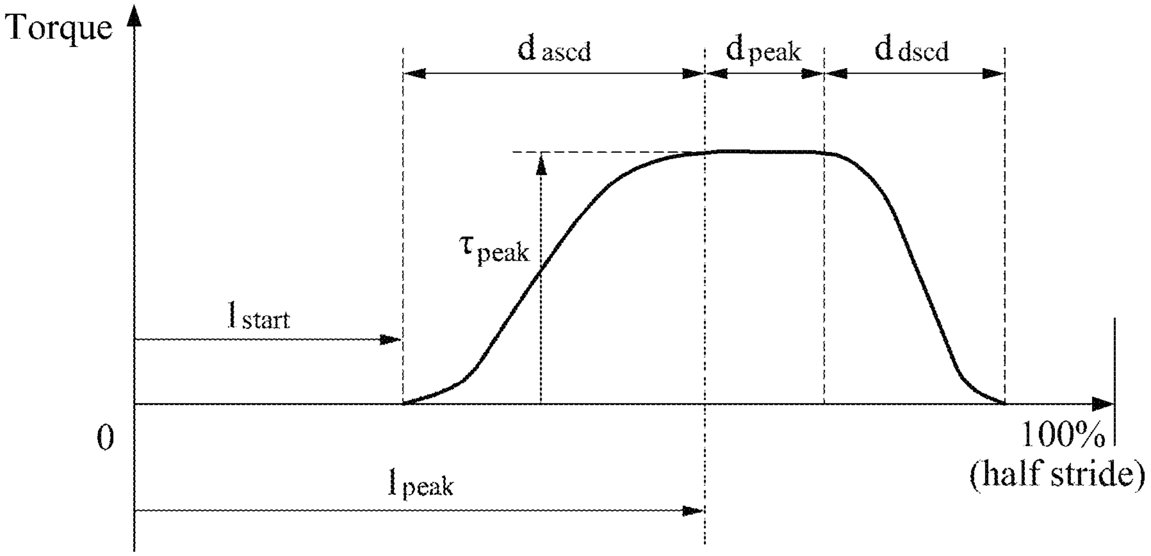
FIG. 6 is a graph illustrating torque parameters included in an assist torque profile according to at least one example embodiment.
Figure 7:
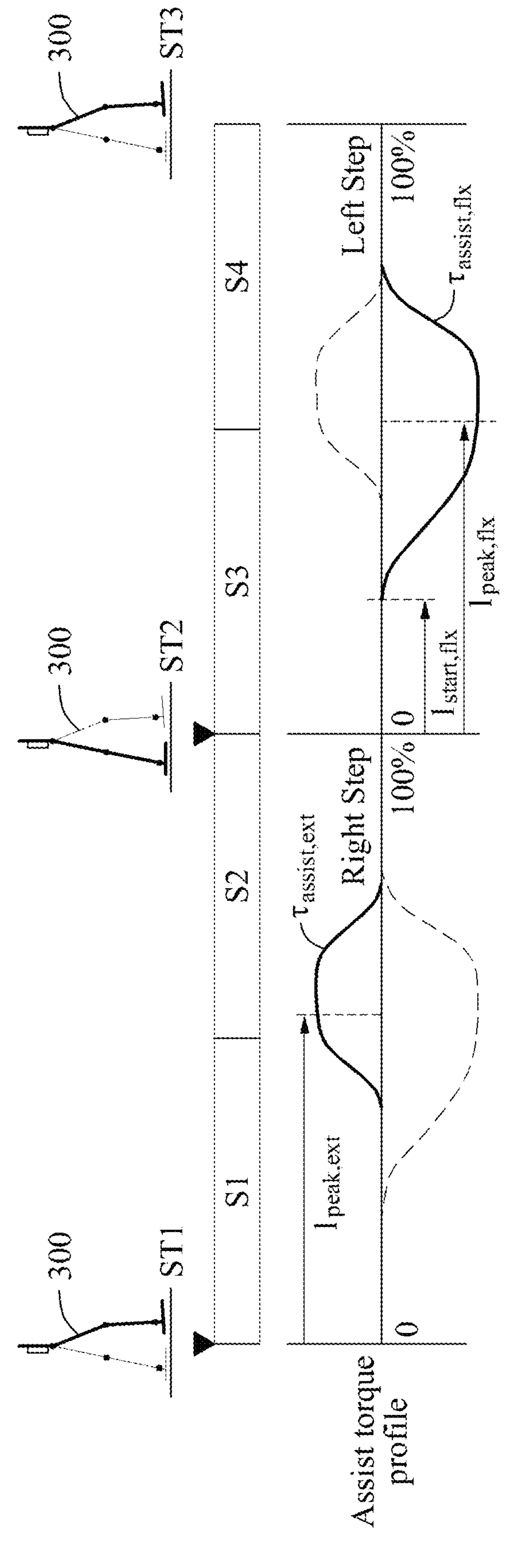
FIG. 7 illustrates an example of an assist torque profile applied to a leg corresponding to a step of a user according to at least one example embodiment.

FIG. 6 is a graph illustrating torque parameters included in an assist torque profile according to at least one example embodiment. FIG. 7 illustrates an example of an assist torque profile applied to a leg corresponding to a step of a user according to at least one example embodiment.

Referring to FIGS. 6 and 7, torque parameters $l_{start}$, $d_{ascd}$, $l_{peak}$, $\tau_{peak}$, $d_{peak}$, and $d_{dsed}$ may be included in an assist torque profile $\tau_{assist}$ corresponding to an abnormal gait type.

$l_{start}$ denotes a point in time at which an assist torque profile is applied. $d_{ascd}$ denotes a period of time during which the assist torque profile reaches a peak. $l_{peak}$ denotes a point in time at which the assist torque profile reaches the peak. $\tau_{peak}$ denotes a quantity of torque corresponding to the point in time at which the assist torque profile reaches the peak. $d_{peak}$ denotes a duration in which the assist torque profile is maintained after reaching the peak. $dd_{sed}$ denotes a duration in which the assist torque profile decreases after reaching the peak.

Thus, the controller 120 may generate the assist torque profile $\tau_{assist}$ corresponding to the abnormal gait type based on the torque parameters $l_{start}$, $d_{ascd}$, $l_{peak}$, $\tau_{peak}$, $d_{peak}$, and $d_{dsed}$.

In FIG. 7, descriptions will be provided based on an example of an assist torque profile applied to legs of the user 300 through steps of the legs.

A state S1 may indicate a state in which a right leg is on a verge of landing to a ground after swinging while a left leg is stepped on the ground. When the left leg and the right leg cross each other in the state S1, a state may be shifted from the state S1 to a state S2.

The state S2 may indicate a state in which the left leg swings while the right leg is stepped on the ground. When a swing of the left leg ends in the state S2, a state may be shifted from the state S2 to a state S3.

The state S3 may indicate a state in which the left leg is on the verge of landing to the ground after swinging while the right leg is stepped on the ground. When the left leg and the right leg cross each other in the state S3, a state may be shifted from the state S3 to a state S4.

The state S4 may indicate a state in which the right leg swings while the left leg is stepping on the ground.

A left step ST2 may occur in response to a shift from the state S2 to the state S3. A right step ST1 or ST3 may occur in response to a shift from the state S4 to the state S1.

As illustrated in FIG. 7, the controller 120 may generate the assist torque profile $\tau_{assist}$ to assist a swinging leg and a supporting leg based on a step cycle every time at which each of the right step ST1, the left step ST2, and the right step ST3 starts. Also, the controller 120 may output the assist torque profile $\tau_{assist}$ to the driver 130 to assist a gait of the user 300.

Hereinafter, a method and/or an apparatus for generating torque parameters corresponding to assist torque parameters of a plurality of abnormal gait types will be explained with reference to the following descriptions.

Figure 8:
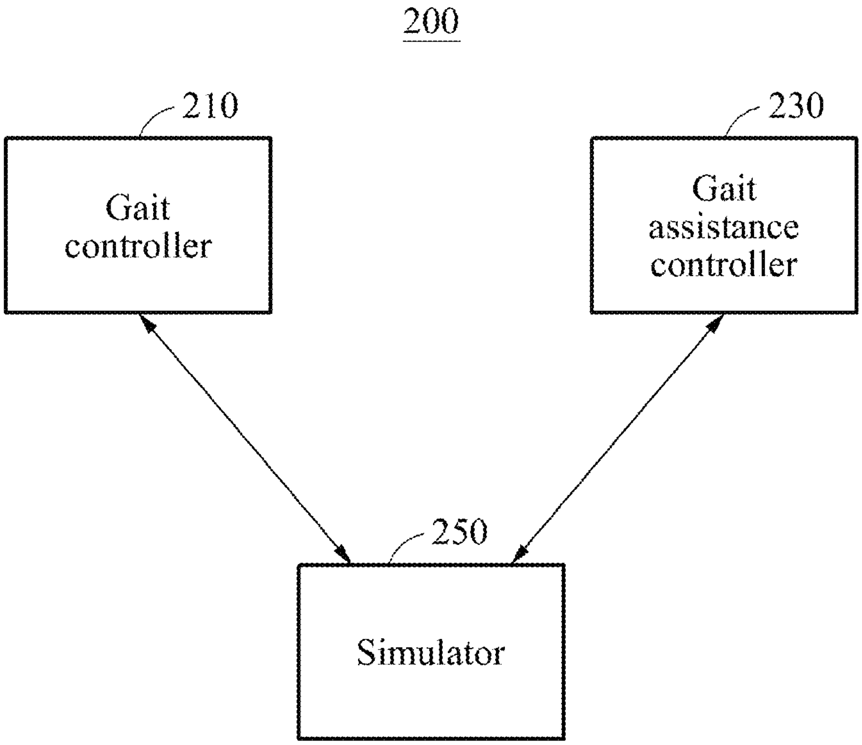
FIG. 8 is a block diagram illustrating a parameter generation apparatus of FIG. 1.
Figure 9:
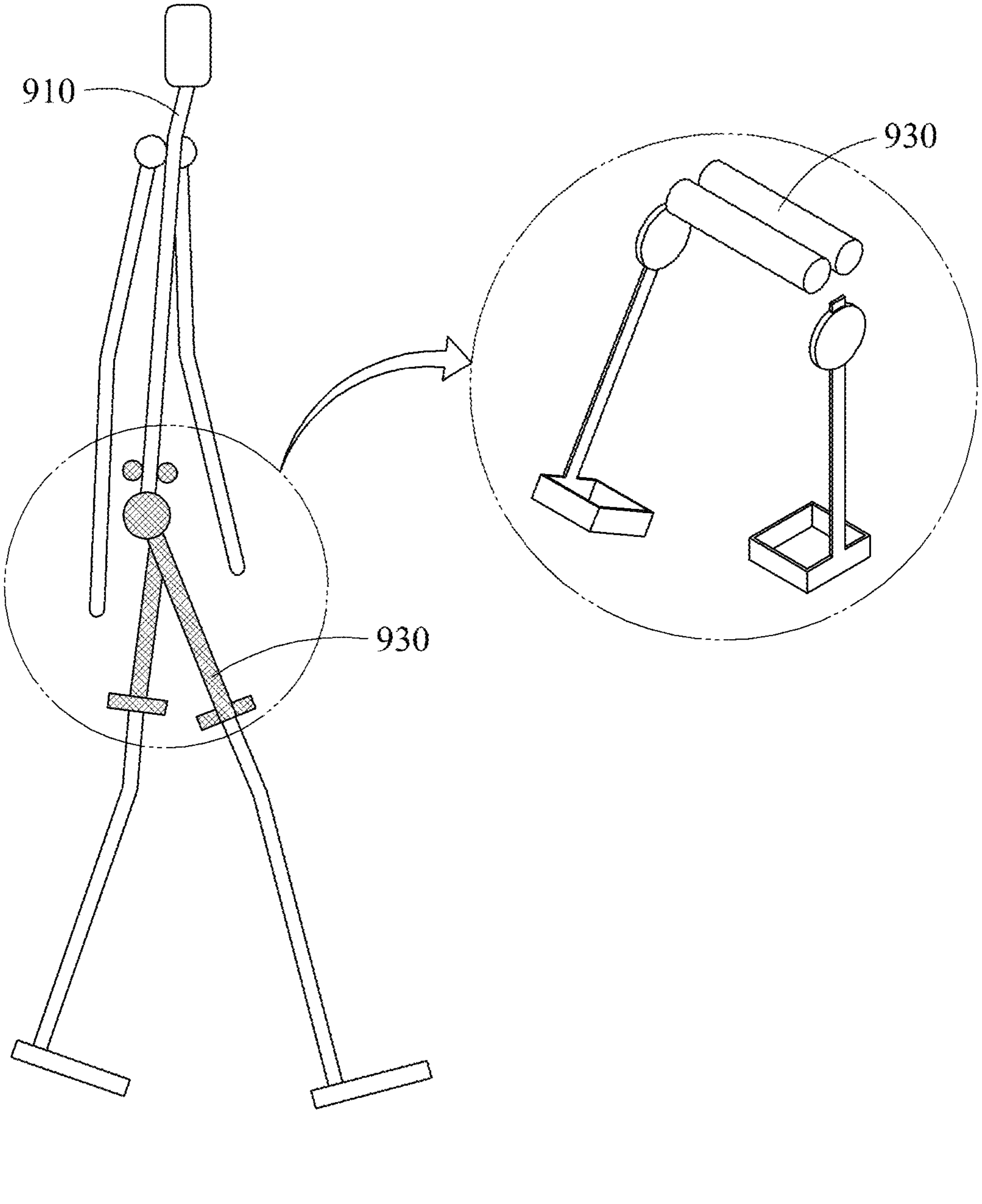
FIG. 9 illustrates an example of simulation models used in a simulation according to at least one example embodiment.
Figure 10:
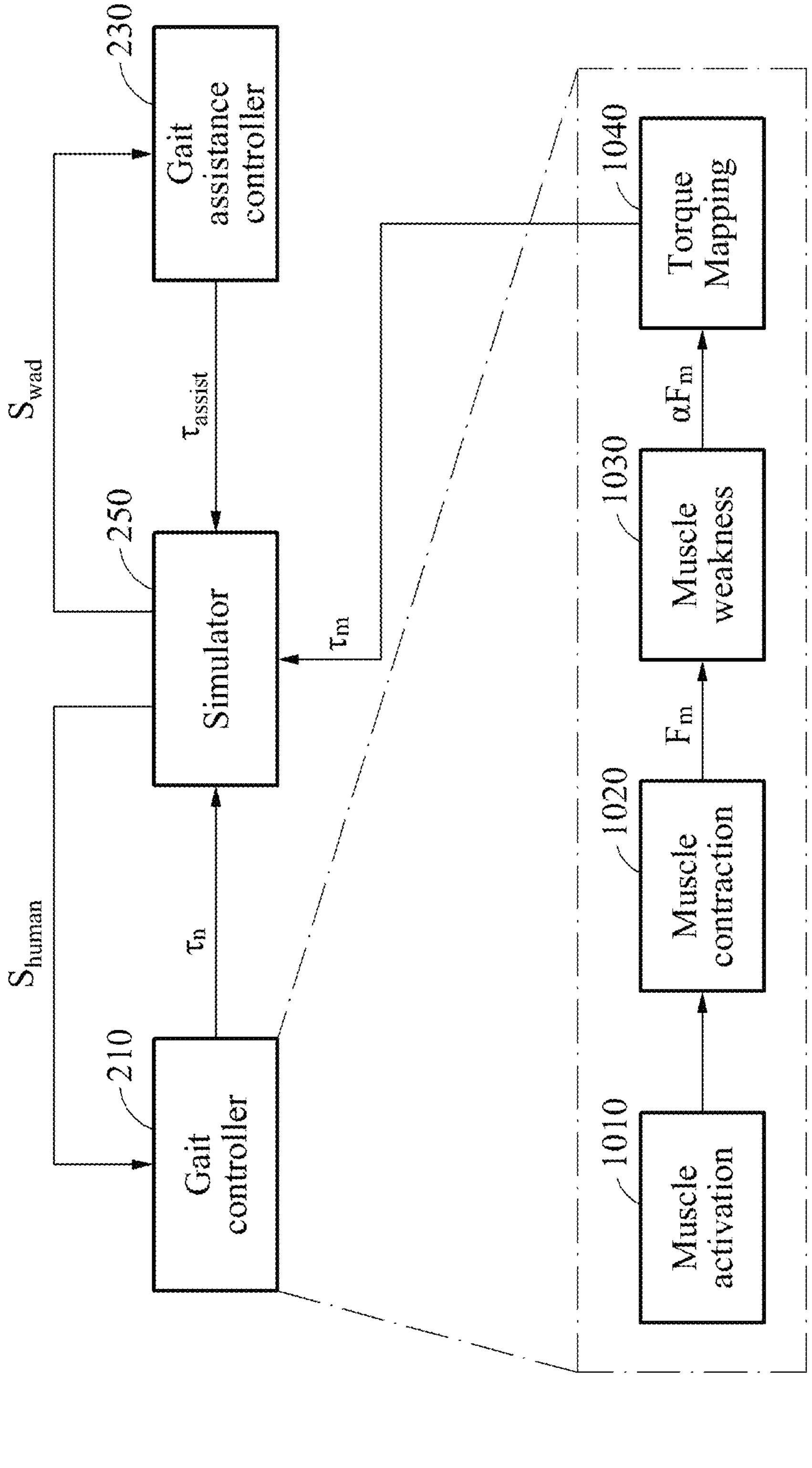
FIG. 10 is a diagram illustrating a method of operating a parameter generation apparatus according to at least one example embodiment.

FIG. 8 is a block diagram illustrating the parameter generation apparatus 200 of FIG. 1 according to at least one example embodiment. FIG. 9 illustrates an example of simulation models used in a simulation according to at least one example embodiment. FIG. 10 is a diagram illustrating an operation method of a parameter generation apparatus according to at least one example embodiment.

Referring to FIGS. 8 through 10, the parameter generation apparatus 200 may use simulation models to generate torque parameters corresponding to each assist torque profile of a plurality of abnormal gait types. For example, the simulation models may be provided as illustrated in FIG. 9. A simulation human model 910 corresponding to the user 300 may include a main lower pelvic limb muscle model, and a simulation apparatus model 930 may correspond to the walking assistance apparatus 100.

The parameter generation apparatus 200 may include a gait controller 210, a gait assistance controller 230, and a simulator 250.

The gait controller 210 may compute a first torque $\tau$ mapped to each joint of a user for each of abnormal gait types based on first control parameters $S_{human}$. The first torque $\tau$ may be mapped to each joint of the human model 910.

The first control parameters $S_{human}$ may include a gait control variable related to a muscular force control and a gait posture control. The first control parameters $S_{human}$ may be control parameters optimized to compute the first torque $\tau$ suitable for each joint of the user with respect to each of the abnormal gait types.

In this example, the first torque $\tau$ may include a torque Tm driven by a muscle tendon unit (MTU) and a torque $\tau_n$ driven by a non-MTU.

The gait controller 210 may generate the torque $\tau_m$ to which muscle features corresponding to each of the abnormal gait types are applied.

As an example, in operation 1010, the gait controller 210 may activate a muscle, for example, a main pelvic limb muscle of the simulation human model 910. In operation 1020, the gait controller 210 may calculate a force $F_m$ to be generated by the MTU when the activated main pelvic limb muscle is contracted. The force $F_m$ may be, for example, an MTU force. In operation 1030, the gait controller 210 may reduce the force $F_m$ based on a ratio a in consideration of muscle features corresponding to a plurality of abnormal gait types. The ratio a may be a ratio to which a gait condition, for example, the muscle features, for each of the abnormal gait types. The gait controller 210 may generate the torque $T_m$ mapped to each joint of, for example, a hip, a knee, and an ankle, based on a reduced force $\alpha F_m$.

The gait assistance controller 230 may compute a second torque $\tau_{assist}$ to be generated by the walking assistance apparatus 100 for each of the abnormal gait types based on second control parameters $S_{wad}$. The second torque $\tau_{assist}$ may be mapped to each torque generated by the simulation apparatus model 930.

The second control parameters $S_{wad}$ may be control parameters optimized to compute the second torque $\tau_{assist}$ to be generated by the walking assistance apparatus 100 for each of the abnormal gait types.

The simulator 250 may generate a gait motion corresponding to each of the abnormal gait types based on the first torque T and the second torque $\tau_{assist}$. For example, the simulator 250 may perform a forward dynamics computation on the first torque T and the second torque $\tau_{assist}$ as shown in Equation 1.

$$\tau+\tau_{assist}=M\ddot{q}+b(q,\dot{q})+J_c^T F_c+J_a^T F_a \qquad \text{[Equation 1]}$$

M(q): mass matrix b(q, q̇): Coriolis, centrifugal, and gravity terms $J_c$, $F_c$: contact Jacobian, forces for foot-ground interaction $J_a$, $F_a$: contact Jacobian, forces for wad-human interaction The simulator 250 may generate the gait motion based on a forward dynamics computation result. The forward dynamics computation result may include a joint angle, a speed, and an acceleration value of each joint in the simulation human model 910 wearing the simulation apparatus model 930. As an example, the simulator 250 may generate the gait motion from a simulation start time, for example, a start time of the gait motion, to a simulation termination time, for example, a termination time of the gait motion, based on the joint angle, the speed, and the acceleration value of each joint. Concisely, the simulator 250 may generate the gait motion based on a trajectory of each joint while the simulation is performed. Through this, the simulator 250 may generate the gait motion corresponding to each of the abnormal gait types.

The simulator 250 may calculate an objective function based on the gait motion. The objective function may be calculated based on Equation 2. In Equation 2, the objective function may be an optimal objective function.

$$\min_X J(X) = J_{energy} + J_{style} + J_{balance} \qquad \text{[Equation 2]}$$

$$J_{energy} = w_m J_m + w_t J_t$$

$$J_{style} = w_s J_s + w_o J_o$$

$$J_{balance} = w_f J_f + w_r J_r + w_p J_p$$

The objective function may include a gait energy consumption, $J_{energy}$, a gait style error, $J_{style}$, and a gait balance, $J_{balance}$.

$J_m$ denotes a metabolic energy expenditure of an MTU. $J_t$ denotes a torque consumption of a non-MTU. $J_s$ denotes a reference walking speed. $J_o$, denotes a reference walking orientation.

$J_f$ denotes a fall over penalty, $J_r$ denotes a walking regularity index indicating a gait regularity, $J_p$ denotes a torso pose angle, and w denotes a weighting factor. For example,. the gait balance may include a stride time variability coefficient variation (CV) index indicating a gait symmetry and the gait regularity, and a posture degree to which an upper body is bent. Also, the simulator 250 may apply a penalty score, for example, the fall over penalty, when the simulation human model 910 falls down. Through this, the simulator 250 may generate a gait posture, for example, the gait motion for preventing the simulation human model 910 from falling down.

The simulator 250 may determine the torque parameters corresponding to each assist torque profile of the abnormal gait types based on an objective function calculation result. In this example, the simulator 250 may perform a dynamic optimization process to increase a gait performance index of the simulation human model 910 wearing the simulation apparatus model 930. The simulator 250 may repetitively perform the simulation by adjusting control parameters, for example, the first control parameters $S_{human}$, and the second control parameters $S_{wad}$ through the dynamic optimization process.

The simulator 250 may determine the control parameters, for example, the first control parameters $S_{human}$, and the second control parameters $S_{wad}$ used in the simulation in which the objective function calculation result satisfies a convergence condition, to be optimization control parameters. In an example, the simulator 250 may determine the optimization control parameters, for example, the second control parameters $S_{wad}$ included in the second torque $\tau_{assist}$ to be generated by the walking assistance apparatus 100.

The convergence condition may be satisfied when a difference in objective function values between a previous simulation and a current simulation is less than or equal to a desired (or, alternatively, a predetermined) value. The desired (or, alternatively, the predetermined) value may be set experimentally.

The simulator 250 may generate the optimization control parameters determined for each of the abnormal gait types through the dynamic optimization process, as the torque parameters corresponding to each of the assist torque profiles of the abnormal gait types.

The optimization control parameters may be provided as represented in Table 1. Also, the optimization control parameters may be stored in the memory 125 of the walking assistance apparatus 100 as the torque parameters corresponding to each of the assist torque profiles of the abnormal gait types.

TABLE 1

| | |
|---|---|
| flexion peak location | $l_{peak,flx}$ |
| flexion peak torque | $\tau_{peak,flx}$ |
| flexion peak duration | $d_{peak,flx}$ |
| flexion ascending duration | $d_{ascd,flx}$ |
| flexion descending duration | $d_{dscd,flx}$ |
| extension peak location | $l_{peak,ext}$ |
| extension peak torque | $\tau_{peak,ext}$ |
| extension peak duration | $d_{peak,ext}$ |
| extension ascending duration | $d_{ascd,ext}$ |
| extension descending duration | $d_{dscd,ext}$ |

Accordingly, the parameter generation apparatus 200 may establish a torque parameter data set to be used as a guideline for various types of abnormal gaits, by using a virtual gait training model based on a dynamics simulation in consideration of an interaction between a user and the walking assistance apparatus 100. Based on the torque parameter data set, the walking assistance apparatus 100 may perform a gait assistance to prevent a safety accident due to an abnormal gait of the user 300.

Figure 11:
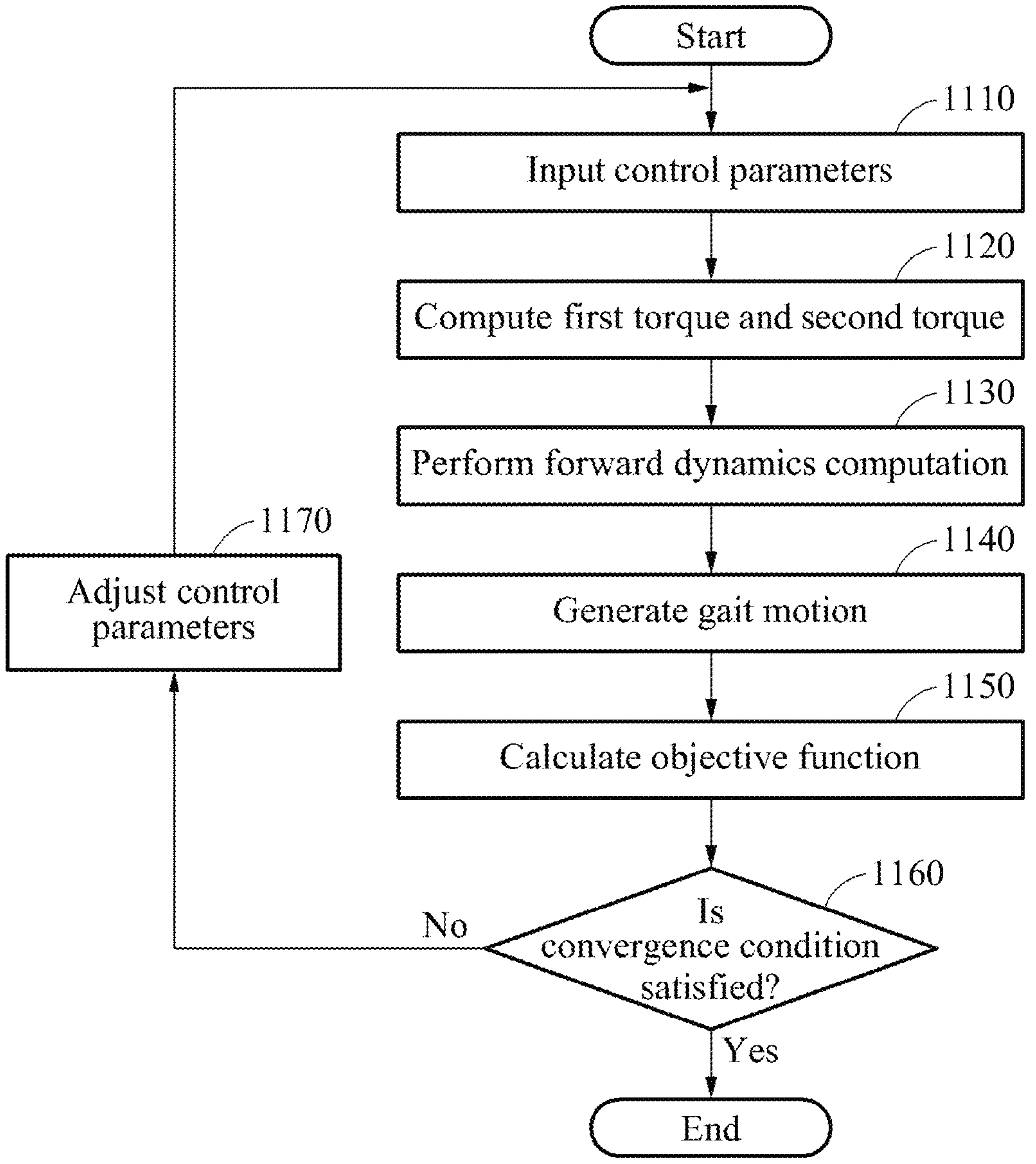
FIG. 11 is a flowchart illustrating a dynamic optimization process of a parameter generation apparatus according to at least one example embodiment.
Figures 12A, 12B:
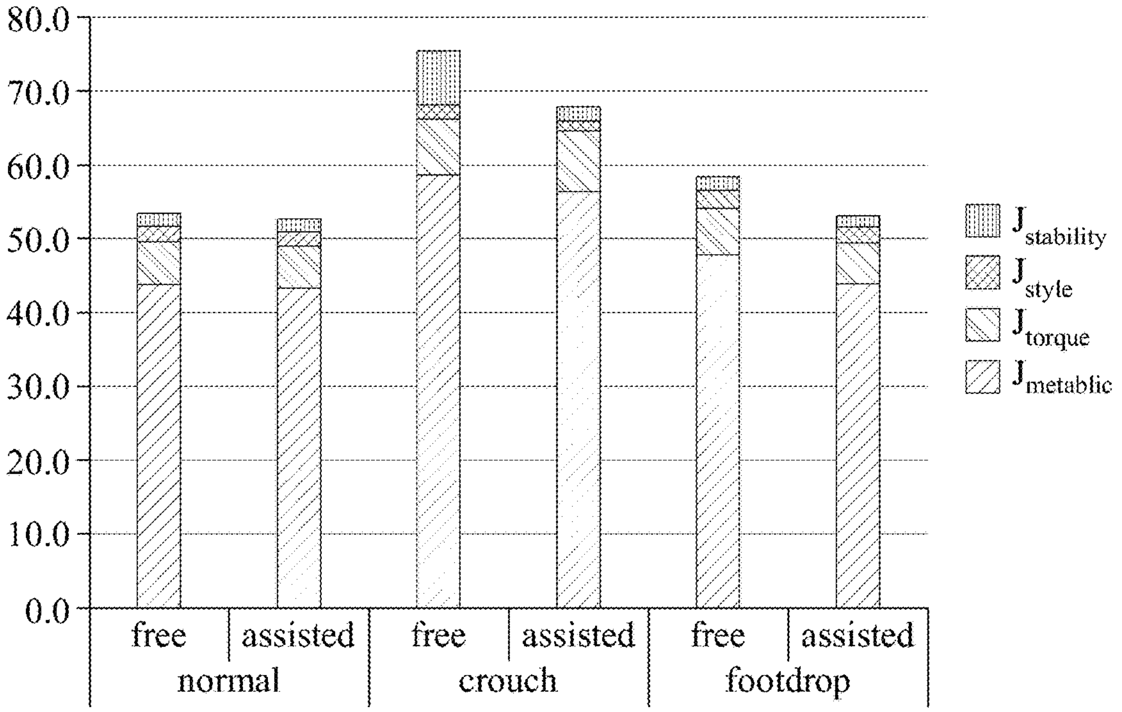
FIGS. 12A and 12B illustrate an example of objective function values corresponding to abnormal gait types through an optimization process according to at least one example embodiment.
Figures 13A, 13B:
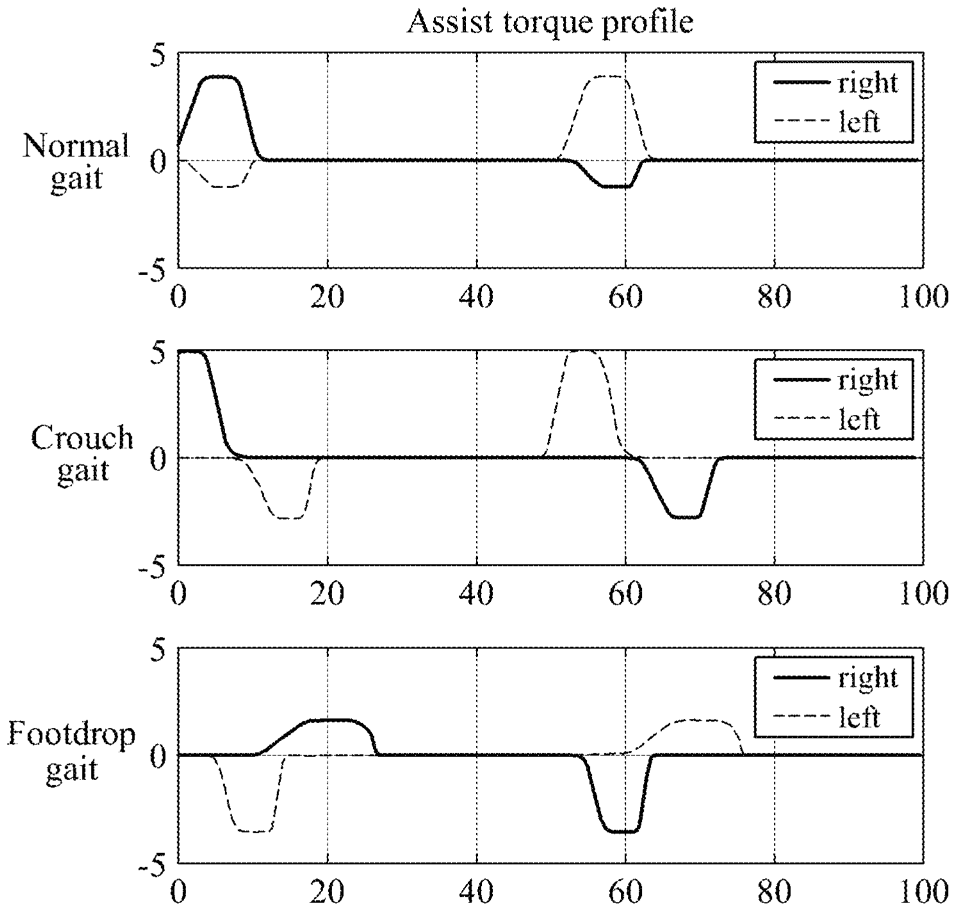
FIGS. 13A and 13B illustrate an example of assist torque profiles and optimization control parameters corresponding to abnormal gait types generated through an optimization process according to at least one example embodiment.

FIG. 11 is a flowchart illustrating a dynamic optimization process of a parameter generation apparatus according to at least one example embodiment. FIGS. 12A and 12B illustrate an example of objective function values corresponding to abnormal gait types through an optimization process according to at least one example embodiment. FIGS. 13A and 13B illustrate an example of assist torque profiles and optimization control parameters corresponding to abnormal gait types generated through an optimization process according to at least one example embodiment.

Referring to FIGS. 11 through 13B, in operation 1110, first control parameters $S_{human}$ may be input to the gait controller 210 and second control parameters $S_{wad}$ may be input to the gait assistance controller 230. When a simulation starts, the simulator 250 may arbitrarily determine control parameters, for example, the first control parameters $S_{human}$ and the second control parameters $S_{wad}$.

In operation 1120, the gait controller 210 may compute a first torque $\tau$ mapped to each joint of a user for each of a plurality of abnormal gait types based on the first control parameters $S_{human}$, and the gait assistance controller 230 may compute a second torque $\tau_{assist}$ to be generated by the walking assistance apparatus 100 for each of the abnormal gait types based on the second control parameters $S_{wad}$.

In operation 1130, the simulator 250 may perform a forward dynamics computation on the first torque $\tau$ and the second torque $\tau_{assist}$ based on Equation 1.

In operation 1140, based on a forward dynamics computation result, the simulator 250 may generate a gait motion for a period of time from a simulation start time, for example, a start time of the gait motion, to a simulation termination time, for example, a termination time of the gait motion.

In operation 1150, based on the gait motion, the simulator 250 may calculate an objective function using Equation 2. In operation 1160, the simulator 250 may verify whether an objective function calculation result satisfies a convergence condition.

When the convergence condition is not satisfied, the simulator 250 may adjust the control parameters in operation 1170. Subsequently, the parameter generation apparatus 200 may perform operations 1110 through 1160 based on the adjusted control parameters. Concisely, the parameter generation apparatus 200 may repetitively perform operations 1110 through 1170 until the convergence condition is satisfied.

When the convergence condition is satisfied, the simulator 250 may terminate the simulation. The simulator 250 may determine the control parameters, for example, the second control parameters $S_{wad}$, used in the simulation in which the objective function calculation result satisfies the convergence condition, as optimization control parameters included in the second torque $\tau_{assist}$ to be generated by the walking assistance apparatus 100.

Referring to FIGS. 12A and 12B, an abnormal gait may be performed with an unstable posture and inefficient in terms of energy consumption when compared to a normal gait. As a result of simulation, a stability may be significantly improved through a posture correction in a case of a crouch gait, and energy consumption may be significantly reduced in a case of a footdrop gait.

Referring to FIGS. 13A and 13B, an abnormal gait, for example, a footdrop gait and a crouch gait, may need to use a guideline of an assist torque profile differing from that of a normal gait.

Figure 14:
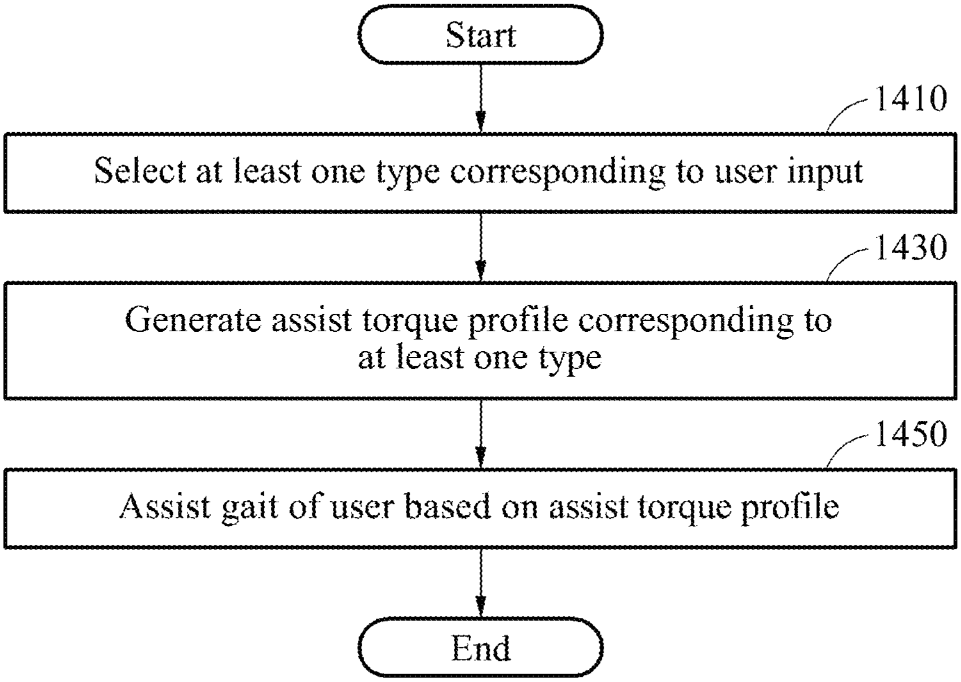
FIG. 14 is a flowchart illustrating a method of operating the walking assistance apparatus of FIG. 1.
Figure 15:
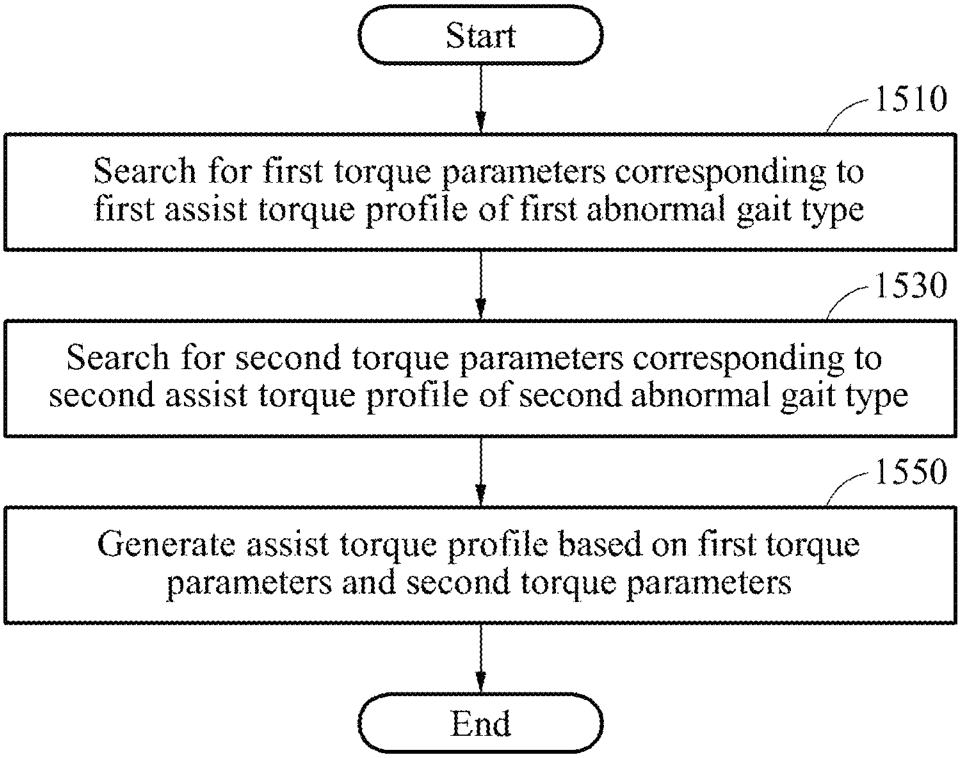
FIG. 15 is a flowchart illustrating a method of generating an assist torque profile according to at least one example embodiment.

FIG. 14 is a flowchart illustrating an operation method of the walking assistance apparatus 100 of FIG. 1. FIG. 15 is a flowchart illustrating a method of generating an assist torque profile according to at least one example embodiment.

Referring to FIGS. 14 and 15, in operation 1410, the controller 120 may select at least one type corresponding to an user input from a plurality of abnormal gait types, for example, pathological gait types.

In operation 1430, the controller 120 may generate an assist torque profile corresponding to the at least one type. In this example, the at least one type may include a first abnormal gait type and a second abnormal gait type. In operation 1510, the controller 120 may search the memory 125 for first torque parameters corresponding to a first assist torque profile of the first abnormal gait type. In operation 1530, the controller 120 may search the memory 125 for second torque parameters corresponding to a second assist torque profile of the second abnormal gait type. In operation 1550, the controller 120 may generate an assist torque profile based on the first torque parameters and the second torque parameters.

In operation 1450, the driver 130 may assist a gait of the user 300 based on the assist torque profile.

Figure 16:
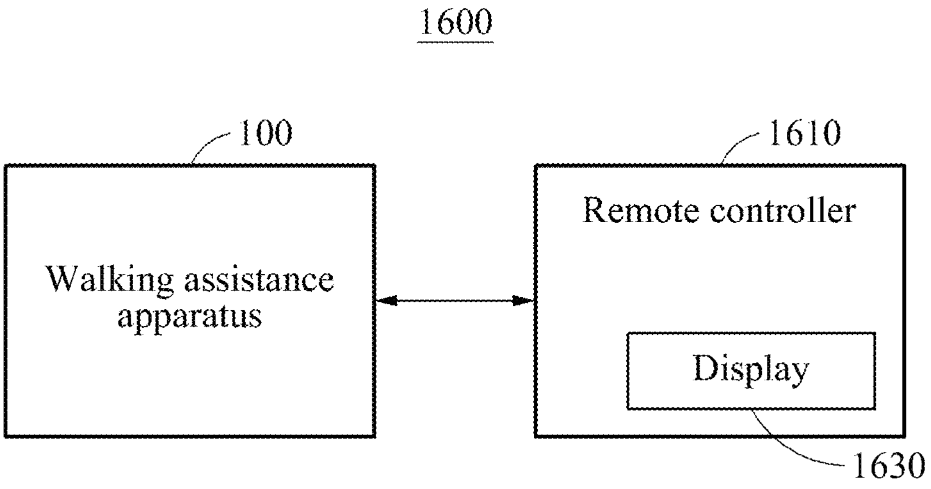
FIG. 16 is a block diagram illustrating another walking assistance system according to at least one example embodiment.

FIG. 16 is a block diagram illustrating a walking assistance system 1600 according to at least one example embodiment.

Referring to FIG. 16, the walking assistance system 1600 may include the walking assistance apparatus 100 and a remote controller 1610.

The remote controller 1610 may control an overall operation of the walking assistance apparatus 100 in response to a user input. For example, the remote controller 1610 may initiate and suspend an operation of the walking assistance apparatus 100. Also, the remote controller 1610 may control an output of an assist torque profile to control a gait assistance performed on the user 300 of the walking assistance apparatus 100.

The remote controller 1610 may include a display 1630. The display 1630 may be implemented as, for example, a touch screen, an LCD, a TFT-LCD, an LED display, an OLED display, an AMOLED display, and a flexible display.

The display 1630 may display the abnormal gait types to be viewed by the user 300. For example, the user 300 may select a gait type of the user 300 from the abnormal gait types displayed on the display 1630.

Also, the remote controller 1610 may provide a user interface (UI) and/or a menu corresponding to a function to manipulate the walking assistance apparatus 100 to the user 300 through the display 1630.

The display 1630 may display an operating state of the walking assistance appaatus 100 to be viewed by the user 300 under a control of the remote controller 1610.

Figure 17:
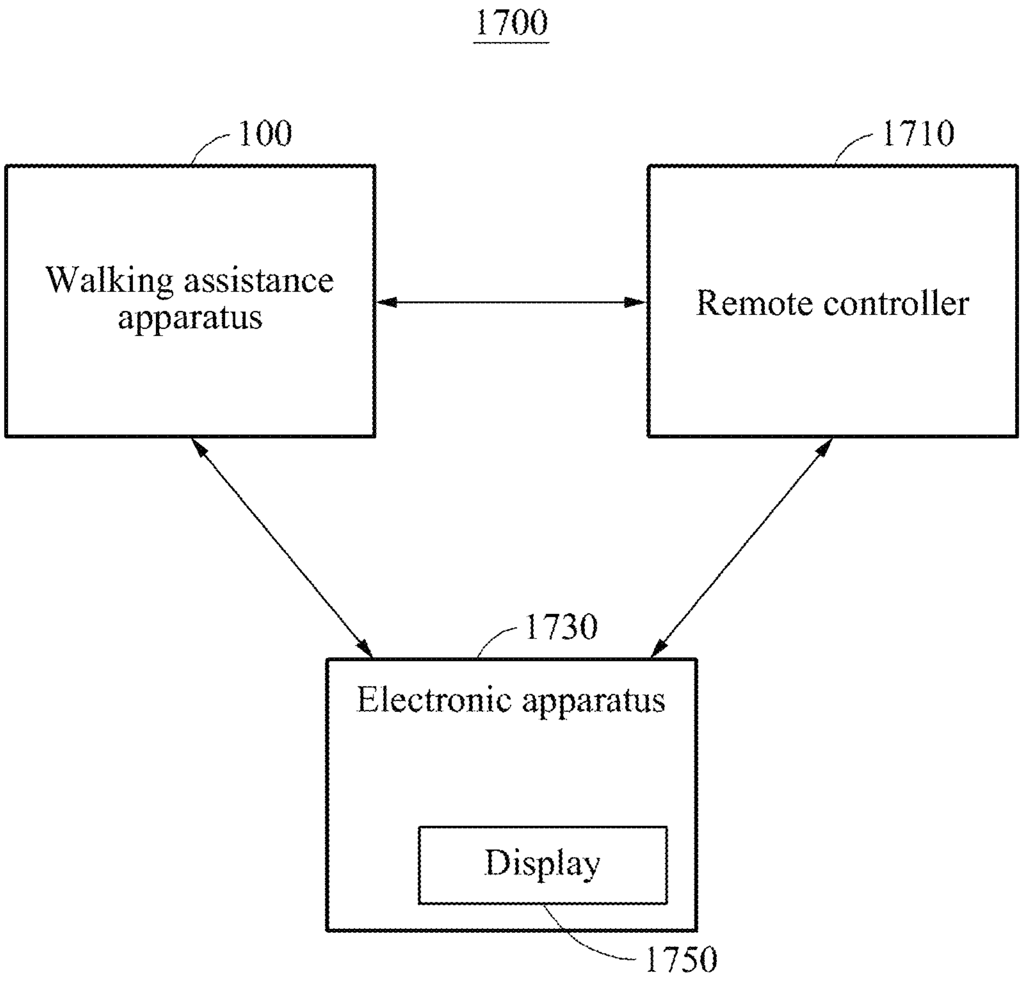
FIG. 17 is a block diagram illustrating still another walking assistance system according to at least one example embodiment.

FIG. 17 is a block diagram illustrating a walking assistance system 1700 according to at least one example embodiment.

Referring to FIG. 17, the walking assistance system 1700 may include the walking assistance apparatus 100 and a remote controller 1710, and an electronic apparatus 1730.

A configuration and an operation of the remote controller 1710 may be substantially the same as a configuration and an operation of the remote controller 1610 in FIG. 16.

The electronic apparatus 1730 may mutually communicate with the walking assistance apparatus 100 and/or the remote controller 1710. The electronic apparatus 1730 may include a display 1750. The display 1750 may be implemented as, for example, a touch screen, an LCD, a TFT-LCD, an LED display, an OLED display, an AMOLED display, and a flexible display.

The display 1750 may display the abnormal gait types to be viewed by the user 300. For example, the user 300 may select a gait type of the user 300 from the abnormal gait types displayed on the display 1750.

Also, the electronic apparatus 1730 may provide a UI and/or a menu corresponding to a function to manipulate the walking assistance apparatus 100 to the user 300 through the display 1750.

The display 1750 may display an operating state of the walking assistance appaatus 100 to be viewed by the user 300.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A walking assistance method comprising:

receiving information of a selection of at least one abnormal gait type from among a plurality of abnormal gait types that are each selectable by a user via a user interface (UI);

obtaining, from a plurality of torque parameters stored in a memory, at least one torque parameter associated with the at least one abnormal gait type selected via the UI; and based on the at least one torque parameter, transmitting, to a walking assistance apparatus, control information for controlling a driver of the walking assistance apparatus such that the walking assistance apparatus compensates for a functional disorder.

2. The method of claim 1, wherein the controlling further comprises:

generating an assist torque profile based on the at least one torque parameter associated with the at least one abnormal gait type.

3. The method of claim 2, the generating comprises:

generating the assist torque profile based on first torque parameters and second torque parameters, the first torque parameters corresponding to a first abnormal gait type of the at least one abnormal gait type, and the second torque parameters corresponding to a second abnormal gait type of the at least one abnormal gait type.

4. The method of claim 3, wherein the generating of the assist torque profile based on the first torque parameters and the second torque parameters comprises:

combining the first torque parameters and the second torque parameters to generate the assist torque profile.

5. The method of claim 3, wherein the generating of the assist torque profile based on the first torque parameters and the second torque parameters comprises:

adding the first torque parameters and the second torque parameters based on a weight to generate the assist torque profile.

6. The method of claim 1, wherein the at least one abnormal gait type comprises:

at least one of a crouch gait, a steppage gait, an antalgic gait, an ataxic gait type, a festinating gait, a vaulting gait, a lurching gait, an equinus gait, a short leg gait, a hemiplegic gait, a circumduction gait, a tabetic gait, a neurogenic gait, a scissoring gait, and a Parkinsonian gait.

7. The method of claim 1, further comprising:

displaying the plurality of abnormal gait types.

8. The method of claim 1, further comprising:

storing torque parameters corresponding to each of assist torque profiles of the plurality of abnormal gait types.

9. The method of claim 8, wherein the storing comprises:

computing, for each of the plurality of abnormal gait types, a first torque mapped to each joint of a user;

computing a second torque to be generated by the walking assistance apparatus for assisting a gait of the user, generating a gait motion based on the first torque and the second torque;

calculating an objective function based on the gait motion; and generating the torque parameters based on a result of the calculating.

10. The method of claim 9, wherein the generating of the gait motion comprises:

performing a forward dynamics computation on the first torque and the second torque; and generating the gait motion based on a result of the forward dynamics computation.

11. The method of claim 2, the generating comprises:

generating the assist torque profile based on first torque parameters and second torque parameters, the first torque parameters corresponding an abnormal gait type, and the second torque parameters corresponding to a gait type.

12. An electronic apparatus comprising:

a memory; and a controller configured to, receive information of a selection of at least one abnormal gait type from among a plurality of abnormal gait types that are each selectable by a user via a user interface (UI), obtain, from a plurality of torque parameters stored in the memory, at least one torque parameter associated with the at least one abnormal gait type selected via the UI, and based on the at least one torque parameter, transmit, to a walking assistance apparatus, control information for controlling a driver of the walking assistance apparatus such that the walking assistance apparatus compensates for a functional disorder.

13. The electronic apparatus of claim 12, wherein the controller is further configured to generate an assist torque profile based on the at least one torque parameter associated with the at least one abnormal gait type.

14. The electronic apparatus of claim 13, wherein the controller is configured to generate the assist torque profile based on first torque parameters corresponding to a first abnormal gait type of the at least one abnormal gait type and second torque parameters corresponding to a second abnormal gait type of the at least one abnormal gait type.

15. The electronic apparatus of claim 14, wherein the controller is configured to combine the first torque parameters and the second torque parameters to generate the assist torque profile.

16. The electronic apparatus of claim 14, wherein the controller is configured to add the first torque parameters and the second torque parameters based on a weight to generate the assist torque profile.

17. The electronic apparatus of claim 12, wherein the at least one abnormal gait type comprises:

at least one of a crouch gait, a steppage gait, an antalgic gait, an ataxic gait, a festinating gait, a vaulting gait, a lurching gait, an equinus gait, a short leg gait, a hemiplegic gait, a circumduction gait, a tabetic gait, a neurogenic gait, a scissoring gait, and a Parkinsonian gait.

18. The electronic apparatus of claim 12, wherein the controller is configured to display the at least one abnormal gait type on a display.

19. The electronic apparatus of claim 12, wherein the torque parameters are generated by calculating an objective function based on a gait motion generated using a first torque and a second torque, the first torque being a torque mapped to at least one joint of the user for each of the plurality of abnormal gait types, and the second torque being a torque to be generated by the walking assistance apparatus.

20. The electronic apparatus of claim 13, wherein the controller is configured to generate the assist torque profile based on first torque parameters corresponding to an abnormal gait type and second torque parameters corresponding to a gait type.

* * * * *